US009606235B2

(12) United States Patent
Clair et al.

(10) Patent No.: US 9,606,235 B2
(45) Date of Patent: Mar. 28, 2017

(54) LASER METROLOGY SYSTEM AND METHOD

(71) Applicant: The Boeing Company, Chicago, IL (US)

(72) Inventors: Jonathan M. Saint Clair, Seattle, WA (US); Mitchell D. Voth, Lake Tapps, WA (US); William D. Sherman, Surprise, AZ (US); David C. Soreide, Seattle, WA (US)

(73) Assignee: The Boeing Company, Chicago, IL (US)

( * ) Notice: Subject to any disclaimer, the term of this patent is extended or adjusted under 35 U.S.C. 154(b) by 96 days.

(21) Appl. No.: 14/156,789

(22) Filed: Jan. 16, 2014

(65) Prior Publication Data

US 2015/0198433 A1    Jul. 16, 2015

(51) Int. Cl.
*G01N 21/00* (2006.01)
*G01S 17/66* (2006.01)
*G01C 11/00* (2006.01)
*G01B 9/02* (2006.01)
*G01B 11/24* (2006.01)

(52) U.S. Cl.
CPC .......... *G01S 17/66* (2013.01); *G01B 9/02027* (2013.01); *G01B 11/2441* (2013.01); *G01C 11/00* (2013.01); *G01B 2290/45* (2013.01)

(58) Field of Classification Search
CPC .. G01B 11/02; G01B 9/02; G01C 3/08; H01L 27/14; G01N 15/02; G01N 21/01
See application file for complete search history.

(56) References Cited

U.S. PATENT DOCUMENTS

| 6,570,646 | B2 * | 5/2003 | Bowers | 356/5.1 |
|---|---|---|---|---|
| 7,701,592 | B2 | 4/2010 | Saint Clair et al. | |
| 7,903,261 | B2 | 3/2011 | Saint Clair et al. | |
| 8,659,749 | B2 * | 2/2014 | Bridges | 356/5.13 |
| 8,692,344 | B2 * | 4/2014 | Oganesian | 257/431 |
| 2002/0135774 | A1 | 9/2002 | De Groot | |
| 2002/0154287 | A1 | 10/2002 | Bowers | |
| 2006/0227317 | A1 * | 10/2006 | Henderson | G01B 11/026 356/28 |

(Continued)

OTHER PUBLICATIONS

Extended European Search Report, EP 15 15 1250 (Jul. 30, 2015).

*Primary Examiner* — Tarifur Chowdhury
*Assistant Examiner* — Jamil Ahmed
(74) *Attorney, Agent, or Firm* — Walters & Wasylyna LLC

(57) ABSTRACT

A laser metrology system may include a modulated measurement beam, a beam splitter for splitting the measurement beam into a local oscillator beam and a transmitted beam, an optical assembly for projecting the transmitted beam to a measured area on a surface of a target structure and for receiving a reflected beam from the measured area, a beam combiner for combining the reflected beam and the local oscillator beam into a detection beam, a detector for processing the detection beam, the detector including a micro-lens for projecting the detection beam, a photodetector for carrying out coherent detection of the detection beam and detector electronics in communication with the photodetector for generating informational data from the detection beam, and a range processor for computing dimensional data about the measured area from the informational data.

20 Claims, 6 Drawing Sheets

(56) References Cited

U.S. PATENT DOCUMENTS

| | | | |
|---|---|---|---|
| 2008/0239281 A1* | 10/2008 | Bridges | 356/5.09 |
| 2011/0300490 A1 | 12/2011 | Rachet et al. | |
| 2012/0044493 A1* | 2/2012 | Smart et al. | 356/336 |
| 2013/0155386 A1* | 6/2013 | Bridges | 356/4.01 |

* cited by examiner

LASER METROLOGY SYSTEM AND METHOD

FIELD

The present disclosure is generally related to metrology systems and, more particularly, to a laser metrology system and method for coherent video measurement of a measured area on a surface of a target structure.

BACKGROUND

The position and orientation of parts during fabrication and assembly require demanding tolerances. Information about the part, such as information about the surface of the part, during production, testing and evaluation must be very accurate in order to meet the increasing demand for high performance products, such as in the aerospace industry. The required tolerances may challenge the capability of available measurement components and systems.

Current coherent laser metrology systems utilize light waves (e.g., laser beams) to perform a variety of positioning and measuring functions. Laser metrology can perform measurements at high resolution and provide accurate geometric dimensional data about the part. Unfortunately, high production rates may be difficult to meet with existing laser metrology systems because the systems measure only one point on the surface of the part at a time. Thus, these systems require significant time to achieve high accuracy.

Since existing solutions are not designed to support high production rates due to being limited by single point measurements, production rates are limited. One solution to this limitation is to build additional work cells. However, achieving higher production flow rates in this manner comes at great expense.

Accordingly, those skilled in the art continue with research and development efforts in the field of laser metrology.

SUMMARY

In one embodiment, the disclosed laser metrology system may include a modulated measurement beam, a beam splitter for splitting the measurement beam into a local oscillator beam and a transmitted beam, an optical assembly for projecting the transmitted beam to a measured area on a surface of a target structure and for receiving a reflected beam from the measured area, a beam combiner for combining the reflected beam and the local oscillator beam into a detection beam, a detector for processing the detection beam, the detector including a micro-lens for projecting the detection beam, a photodetector for carrying out coherent detection of the detection beam and detector electronics in communication with the photodetector for generating informational data from the detection beam, and a range processor for computing dimensional data about the measured area from the informational data.

In another embodiment, the disclosed laser metrology system may include a signal beam projector including a laser for transmitting a modulated signal beam, a guide beam projector including a laser for transmitting a guide beam, a combiner for combining the signal beam and the guide beam into a modulated measurement beam, a beam splitter for splitting the measurement beam into a local oscillator beam and a transmitted beam, transmitted beam optics for shaping the transmitted beam to a measured area on a surface of a target structure, reflected beam optics for collecting a reflected beam returned from a plurality of measured points on the surface within the measured area, local oscillator beam optics for controlling an amount of light of the local oscillator beam, a beam combiner for combining the reflected beam and the local oscillator beam into a detection beam, a detector for processing the detection beam, the detector including a plurality of micro-lenses forming a micro-lens array for projecting at least a portion of the detection beam, a plurality of photodetectors forming a photodetector array for carrying out coherent detection of the portion of the detection beam and detector electronics in communication with the photodetector for generating informational data from the portion of the detection beam, a range processor for computing dimensional data about the plurality of measured points from the informational data and an imaging system for providing an image of the surface of the target structure.

In yet another embodiment, also disclosed is a method for laser metrology, the method may include the steps of: (1) transmitting a modulated signal beam, (2) transmitting a guide beam, (3) combining the signal beam and the guide beam into a measurement beam, (4) splitting the measurement beam into a local oscillator beam and a transmitted beam, (5) conditioning the transmitted beam for optimum measurement of a measured area of the surface of the target structure, (6) projecting the transmitted beam upon the measured area of the surface, (7) collecting a reflected beam from at least one measured point on the surface within the measured area, (8) combining the reflected beam and the local oscillator beam into a detection beam, (9) projecting the detection beam to detector, the detector including a plurality of micro-lenses, a plurality of photodetectors and detector electronics, (10) processing the detection beam, the processing including carrying out coherent detection of the detection beam and generating informational data from the detection beam and (11) calculating range values from the informational data for the measured point.

Other embodiments of the disclosed laser metrology system and method will become apparent from the following detailed description, the accompanying drawings and the appended claims.

DETAILED DESCRIPTION

Figure 1:
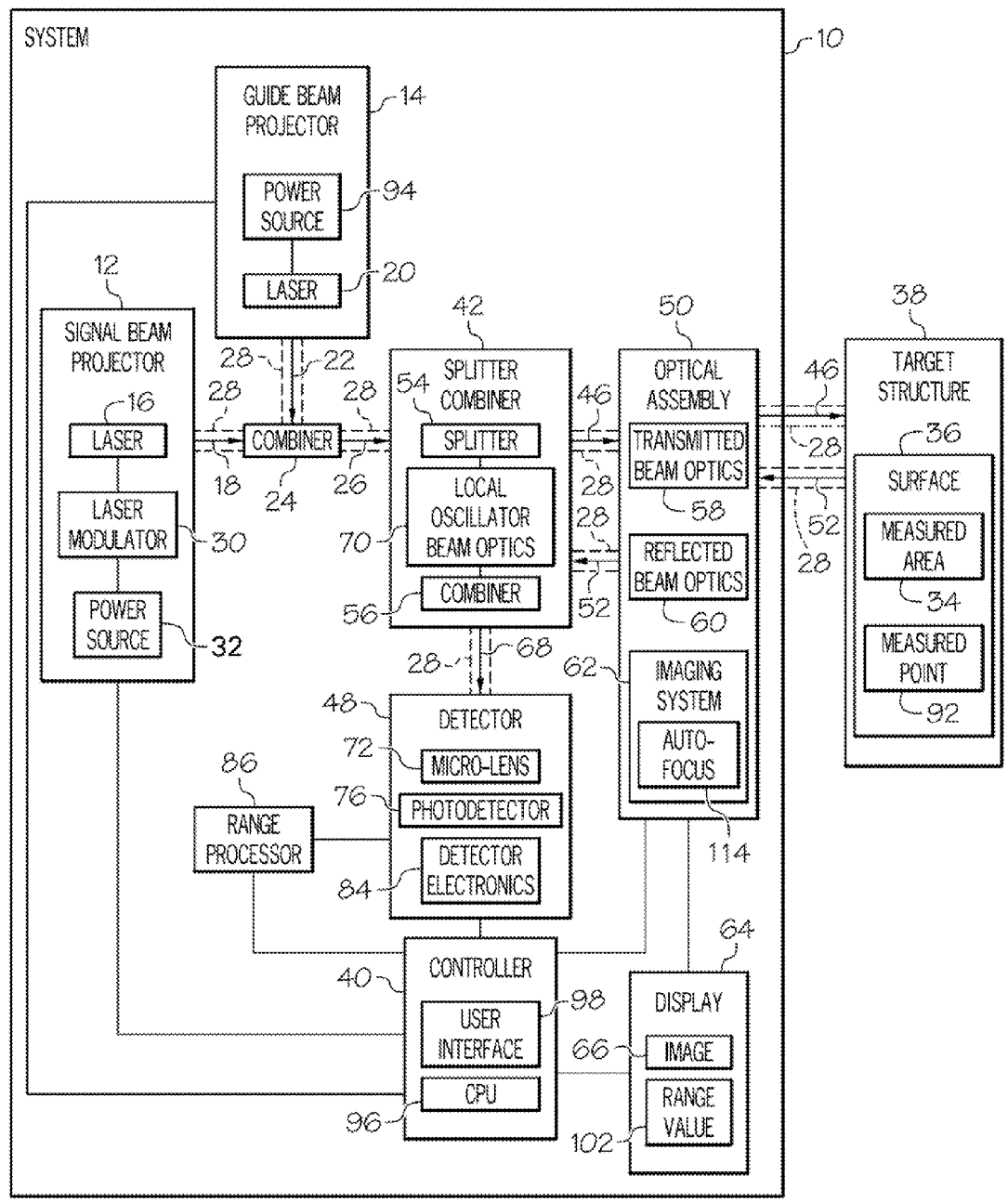
FIG. 1 is a block diagram showing one embodiment of the disclosed laser metrology system.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of the disclosed laser metrology system, generally designated 10, for coherent video measurement may include a signal beam projector 12 and a guide beam projector 14. The signal beam projector 12 may include at least one laser 16. The laser 16 may be a continuous wave ("CW") laser that transmits a single frequency continuous laser beam or a pulsed laser that transmits a single frequency pulsed laser beam. For example, the laser 16 may include a diode pumped solid-state laser. The laser 16 may be capable of projecting a signal beam 18 (e.g., a laser beam) as an output. The signal beam 18 may include various characteristics. For example, the signal beam 18 may include a wavelength in the non-visible spectrum.

A power source 32 may be configured to supply current to the signal beam projector 12 (e.g., one or more lasers 16). A laser modulator 30 may be positioned between and connected to the laser 16 and the power source 32. In an example embodiment, the laser modulator 30 may modulate the signal beam 18 (e.g., the laser output) of the laser 16 by controlling the power source 32. In another example embodiment, the frequency of multiple signal beams 18 transmitted from multiple lasers 16 may be modulated, with small differences in frequency for each signal beam 18.

Figure 2:
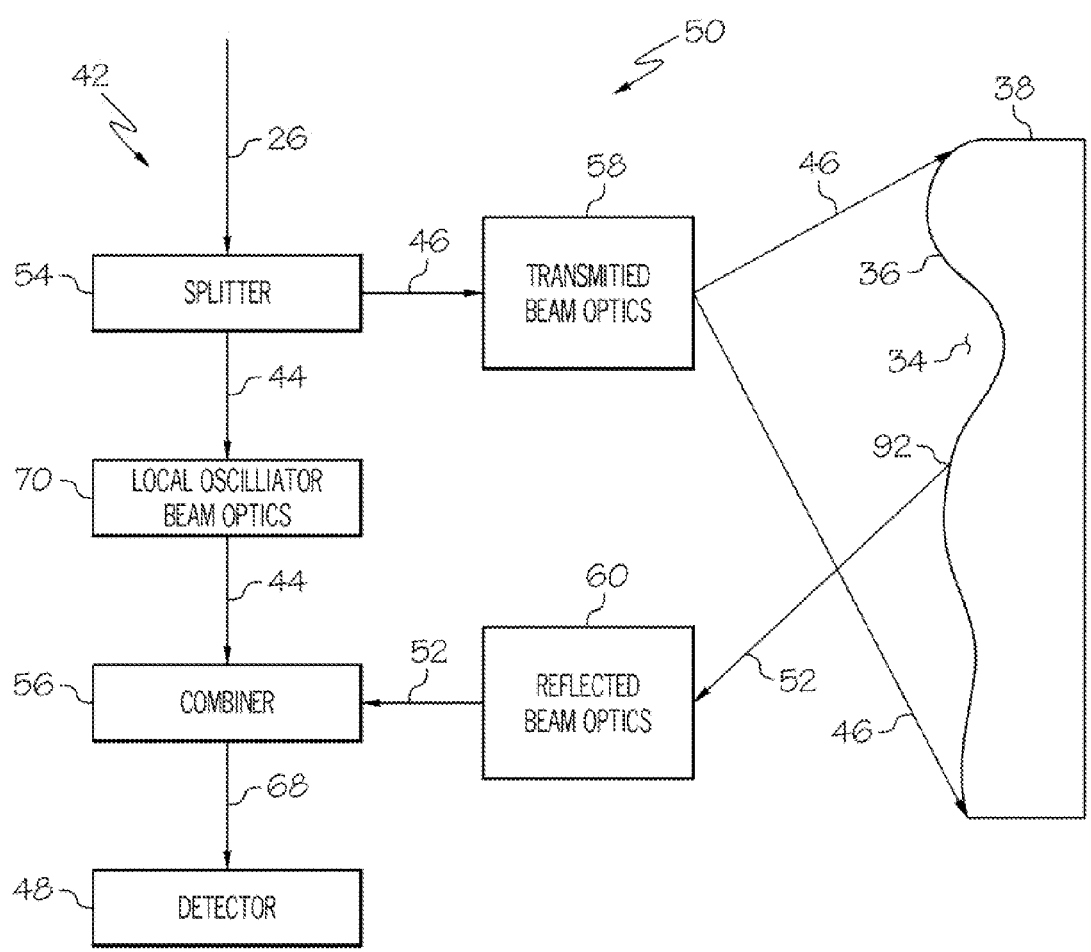
FIG. 2 is a block diagram of a configuration of the splitter/combiner and optical assembly of the disclosed laser metrology system.

The laser modulator 30 may be configured to modulate the signal beam 18 according to any desired power output or parameter, including, for example, amplitude, frequency, phase and/or polarity. For example, the signal beam 18 may be modulated to achieve a best range precision for a particular metrology application. The degree of modulation required may be based on any suitable variable, for example, a measured area 34 to be scanned on a surface 36 of a target structure 38 (FIG. 2). For example, a look-up table may include the measured area 34 and corresponding power density of a laser beam at a given set of coordinates on the surface 36 of the target structure 38, at a given laser output.

The guide beam projector 14 may include at least one laser 20. The laser 20 may be a continuous wave ("CW") laser that transmits a single frequency continuous laser beam or a pulsed laser that transmits a single frequency pulsed laser beam. For example, the laser 20 may include a diode pumped solid-state laser. The laser 20 may be capable of projecting a guide beam 22 (e.g., a laser beam) as an output. The guide beam 18 may include various characteristics. For example, the guide beam 22 may be a laser beam having a wavelength in the visible spectrum. Additionally, the guide beam 22 may include a pulsing frequency, which can allow it to be emitted in pulses rather than continuously. A power source 94 may be configured to supply current to the guide beam projector 14 (e.g., one or more lasers 20).

A controller 40 may be connected to the signal beam projector 12 and the guide beam projector 14. The controller 40 may be configured to direct a desired current signal from the power source 32 to the signal beam projector 12 (e.g., one or more lasers 16) and from the power source 94 to the guide beam projector 14 (e.g., one or more lasers 20). For example, the controller 40 may be configured to dictate the amount of current that power source 32 and/or the power source 94 may provide and may be further configured to cut off the current output.

The controller 40 may be configured to initiate a modulation sequence and may determine how the laser modulator 30 modulates the current from the power source 32. For example, the controller 40 may be configured to determine the appropriate modulation based on a stored value for the desired power of the signal beam 18.

The controller 40 may include a central processing unit ("CPU") 96 (e.g., microprocessor, a computer, computer network, or central server). The controller 40 may include a user interface 98 to permit a user to direct various aspects of disclosed system 10, including, for example, the value and duration of the current output by the power source 32 and the power source 94 and the duration and type of modulation for the signal beam 18. The controller 40 may include an electrically coupled power source (not shown).

The signal beam 18 and the guide beam 22 may be projected (e.g., directed) through a beam combiner 24. The beam combiner 24 may be any optical beam combiner suitable to align and combine the signal beam 18 and the guide beam 22 into a measurement beam 26.

Referring to FIGS. 1 and 2, the measurement beam 26 may be projected through a beam splitter/combiner 42. The beam splitter/combiner 42 may include any optical beam splitter 54 suitable to separate and redirect the measurement beam 26 into a local oscillator beam 44 and a transmitted beam 46 (FIG. 2).

Those skilled in the art will recognize the local oscillator beam 44 is required for coherent detections. The local oscillator beam 44 may include that portion of the laser output (e.g., the measurement beam 26) that does not leave the instrument (e.g., is not directed toward the target structure 38) and that is directed to optimally overlap the reflected laser energy (e.g., a reflected beam 52) from the measured area 34 of the target structure 38 onto a receiver detector (e.g., detector 48). For example, the beam splitter 54 may split the laser output (e.g., the measurement beam 26), sending a large fraction of the laser energy (e.g., the transmitted beam 46) out to the intended measurement areas (e.g., the measured area 34 of the target structure 38) and sending a smaller fraction of the laser energy (e.g., the local oscillator beam 44) to the detector (e.g., detector 48).

The transmitted beam 46 may be projected from the beam splitter 54 through an optical assembly 50. The transmitted beam 46 may be projected from the optical assembly 50 upon the surface 36 of the target structure 38 to define the measured area 34. The target structure 38 may be any object, such as an article of manufacture, having a randomly rough surface 36 to be measured by the disclosed system 10. Light may be reflected back from the surface 36 of the target structure 38 in the form of at least one reflected beam 52. The reflected beam 52 may be returned (e.g., directed) through the optical assembly 50.

The reflected beam 52 may be projected through the beam splitter/combiner 42 and combined with the local oscillator beam 44 into a detection beam 68. The local oscillator beam 44 may provide high sensitivity to the measurement of the detection beam 68. The beam splitter/combiner 42 may include any optical beam combiner 56 suitable to combine the local oscillator 44 and the reflected beam 52 into the detection beam 68 (FIG. 2). The detection beam 68 may be projected from the beam combiner 56 to a detector 48 for processing.

Those skilled in the art will appreciate that the beam splitter 54 and the beam combiner 56 may be a unitary assembly (e.g., beam splitter/combiner 42) or may be discrete components.

The beam splitter 54 may include optical components used to split a laser beam (e.g., input light) into two separate parts. For example, the beam splitter 54 may include plate, cube, pellicle, polka dot, or specialty prism beam splitters. Optionally, the beam splitter 54 may include a variety of anti-reflection coatings or substrates. As a specific, non-limiting example, a standard beam splitter may split incident light by a specified ratio that is independent of wavelength or polarization state. As another specific, non-limiting example, a dichroic beam splitter may split light by wavelength. As another specific, non-limiting example, a non-polarizing beam splitter may split light by overall intensity. As yet another specific, non-limiting example, a polarizing beam splitter may split light by polarization state.

The beam combiner 24, 56 may include optical components used to combine multiple laser beams (e.g., input light), for example, at an angle of incidence (e.g., 45°). For example, the beam combiner 24, 56 may include plate, cube, pellicle, polka dot, or specialty prism beam combiner.

The optical assembly 50 may include one or more beam shaping elements, such as one or more conventional optical lenses and beam shaping lenses. The optical assembly 50 may provide for adjustable spacing among the optical lenses and between beam shaping lenses and the laser output (e.g., the transmitted beam 46). The optical assembly 50 may include optical function parameters (e.g., focal length) chosen such that, in combination, changes in spacing may cause the output beam (e.g., the transmitted beam 46) to diverge or converge as required by a particular application.

For example, the optical assembly 50 may condition the shape of the transmitted beam 46 for optimum measurement of the measured area 34 on the surface 36 of the target structure 38. The transmitted beam 46 may be shaped and powered to optimize the return of the reflected beam 52 (e.g., reflected light) from a single measured point 92 on the surface 36 of the target structure 38 or from a plurality of measured points 92 of the measured area 34 on the surface 36 of the target structure 38.

In an example embodiment, the optical assembly 50 may include one or more transmitted beam optics 58 for projecting the transmitted beam 46 to the target structure 38. For example, the transmitted beam optics 58 may be configured to arrange (e.g., expand) the transmitted beam 46 and control the amount of light projected upon the surface 36 of the target structure 38 (e.g., to have a distribution sufficient to cover the measured area 34 on the surface 36 of the target structure 38). The transmitted beam optics 58 may include one or more lenses, mirrors, prisms, and/or optical fibers of any suitable combination, which can focus, expand, collimate, direct, redirect, reflect, filter, or otherwise transform the transmitted beam 46 in any suitable manner.

The optical assembly 50 may receive light reflected from the surface 36 of the target structure 38. The reflected beam 52 (e.g., scattered reflected light) returned from the target structure 38 may reversely proceed along a similar optical path to that of the transmitted beam 46 and through the optical assembly 50. In an example embodiment, the optical assembly 50 may include one or more reflected beam optics 60 for receiving the reflected beam 52 from one or more measured points 92 on the surface 36 of the target structure 38 (e.g., within the measured area 34). For example, the reflected beam optics 60 may be configured to focus the reflected beam 52 and optimally gather and collect the reflected beam 52 (e.g., reflected light). The reflected beam optics 60 may include one or more lenses, mirrors, prisms, and/or optical fibers of any suitable combination, which can focus, expand, collimate, direct, redirect, reflect, filter, or otherwise transform the reflected beam 52 in any suitable manner.

The optical assembly 50 may include an imaging system 62 to provide images 66 of the target structure 38, for example, to a display 64 (FIG. 1). The images 66 may visually display the target structure 38 being measured and the status of the point 92 and/or the area 34 being measured. For example, the imaging system 62 may be an electro-optics system, such as a video camera (e.g., a charge-coupled device ("CCD") camera). The imaging system 62 may include an autofocus 114 and operate at varying distances (e.g., relative to the target structure 38). The imaging system 62 may be centered and focused on the visible portion (e.g., guide beam 22) of the transmitted beam 46. The display 64 may also indicate other information associated with the metrology operation, measurement requirements, and/or notifications or alerts to the user (e.g., operator). The optical assembly 50, including the imaging system 62, may include an electrically coupled power source (not shown).

In an example embodiment, prior to passing through the beam combiner 56, the local oscillator beam 44 may be projected through one or more local oscillator beam optics 70 for projecting the local oscillator beam 44 to the detector 48. For example, the local oscillator beam optics 70 may be configured to condition the local oscillator beam 44 and control the amount of light projected upon the detector 48. The local oscillator beam optics 70 may include one or more lenses, mirrors, prisms, and/or optical fibers of any suitable combination, which can focus, expand, collimate, direct, redirect, reflect, filter, or otherwise transform the local oscillator beam 44 in any suitable manner.

At this point, those skilled in the art will appreciate that the local oscillator beam optics 70, the transmitted beam optics 58 and/or the reflected beam optics 60 may be integrated entirely within the beam splitter/combiner 42, integrated entirely within the optical assembly 50, integrated in part within the beam splitter/combiner 42 and in part within the optical assembly 50 or may be discrete components of the disclosed system 10.

The signal beam 18, the guide beam 22, the measurement beam 26, the reflected beam 52 and/or the detection beam 68 may be directed through any suitable optical channel 28 (FIG. 1). The optical channel 28 may include free space, optical fibers and/or a fiber array of any suitable combination and configuration.

Referring to FIG. 1, the detector 48 may receive the detection beam 68 and convert photons to electrons for processing. The detector 48 may include at least one micro-lens 72. The micro-lens 72 may be configured to gather (e.g., collect) the detection beam 68 (e.g., light) for a specific region (e.g., the measured area 34) on the surface 36 of the target structure 38. The micro-lens 72 may project the detection beam 68 to a photodetector 76 and, thus, may increase optical energy collection by the photodetector 76.

The photodetector 76 may detect the detection beam 68 (e.g., light output) projected from the micro-lens 72 and generate an electrical signal. Thus, the photodetector 76 may carry out coherent detection (e.g., optical heterodyne detection) of the detection beam 68. The photodetector array 78 may convert incident optical energy (e.g., from light output of the detection beam 68) to electrons that are collected and processed in detector electronics 84.

Figure 3:
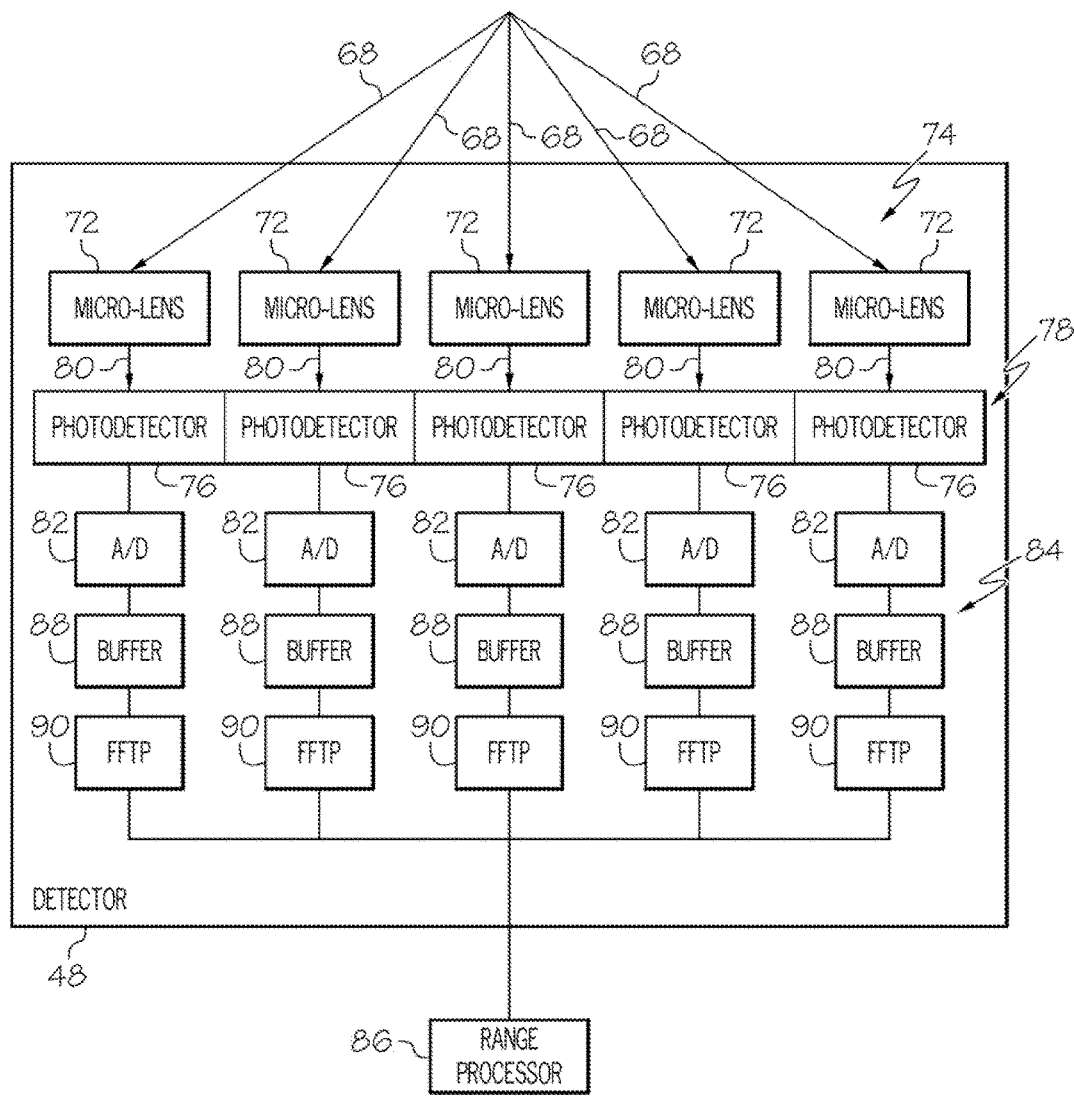
FIG. 3 is a block diagram of a configuration of the detector of the disclosed laser metrology system.

Referring to FIG. 3, the detector electronics 84 may sample the electrical signal from the photodetector 76 and may supply the data to a range processor 86. The detector electronics 84 may include at least one analog-to-digital ("A/D") converter 82, at least one buffer 86, and at least one fast Fourier transform processor ("FFTP") 90. The detector electronics 84 may include an electrically coupled power source (not shown).

The electrical signals, which are detected and generated by the photodetectors 76, may be transmitted to the A/D converter 82. The A/D converter 82 may convert the electrical signals into digital signals. The buffer 88 may be a temporary storage location (e.g., physical memory storage)

used to temporarily store the digital signals while they are being transmitted from the A/D converter 82 to the FFTP 90. The FFTP 90 may compute a spectrum of informational data from the digital signal extracted from the buffer 88. The data generated by the FFTP 90 may be transmitted to the range processor 86.

As illustrated in FIG. 3, in an example embodiment, a plurality of micro-lenses 72 may form a micro-lens array 74 and a plurality of photodetectors 76 may form a photodetector array 78. The micro-lens array 78 may increase optical energy collection by the photodetector array 78. Each micro-lens 72 may project light representing a portion of the surface 36 of the target structure 38 (e.g., at least one measured point 92). Each photodetector 76 may define an array of pixels representing the portion of the surface 36 of the target structure 38. For example, each micro-lens 72 may project a portion 80 of the detection beam 68 to an associated (e.g., optically coupled) photodetector 76. The plurality of micro-lenses 72 forming the micro-lens array 74 may control how the detection beam 68 (e.g., the portion 80 of the detection beam 68) is distributed on the photodetector array 78, thus controlling mapping of surface 36 of the target structure 38 (FIG. 2).

Each photodetector 76 may generate an electrical signal in response to the portion 80 of the detection beam 68 received from an associated micro-lens 72. The detector electronics 84 may sample the electrical signal from the photodetector 76 and may supply the sampled data to the range processor 86. The detector electronics 84 may include a plurality of analog-to-digital ("A/D") converters 82, a plurality of buffers 86, and a plurality of fast Fourier transform processors ("FFTPs") 90.

As illustrated in FIG. 2, the transmitted beam 46 may be configured to illuminate the measured area 34, such that one or more measured points 92 on the surface 36 of the target structure 38 (e.g., within the measured area 34) are represented in the reflected beam 52. As illustrated in FIG. 3, the detection beam 68 (e.g., the combined reflected beam 52 and local oscillator beam 44) may be configured by the micro-lens array 74 to illuminate the photodetector array 78 such that one or more different measured points 92 are imaged to different photodetectors 76.

In an example implementation, the detector electronics 84 may process each individual photodetector 76 of the photodetector array 78 (e.g., discretely). In another example implementation, the detector electronics 84 may process every photodetector 76 of the photodetector array 78 consecutively (e.g., in sequence). In another example implementation, the detector electronics 84 may process every photodetector 76 of the photodetector array 78 simultaneously (e.g., in parallel).

For example, the A/D converter 82 may be controlled to measure all the pixels generated by the photodetector array 78 (e.g., from each of the plurality of photodetectors 76). As another example, the A/D converter 82 may be controlled to measure a sub-set of pixels generated by the photodetector array 78 (e.g., from a sub-set of photodetectors 76). As yet another example, an associated A/D converter 82 may be controlled to measure a sub-set of pixels generated by each photodetector 76 of the photodetector array 78.

In an example embodiment, a single A/D converter 82 may be electrically coupled to the entire plurality of photodetectors 76 of the photodetector array 76. In another example embodiment, each sub-set (e.g., two or more photodetectors 76) of photodetectors 76 of the photodetector array 78 may be electrically coupled to an associated A/D converter 82. In yet another example embodiment, each photodetector 76 of the photodetector array 78 may be electrically coupled to an associated A/D converter 82.

Similarly, in another example embodiment, a single buffer 88 may be electrically coupled to an entire plurality of A/D converters 82. In another example embodiment, each sub-set (e.g., two or more A/D converters 82) of the plurality of A/D converters 82 may be electrically coupled to a single buffer 88. In yet another example embodiment, each A/D converter 82 may be electrically coupled to an associated buffer 88.

Similarly, in another example embodiment, a single FFTP 90 may be electrically coupled to an entire plurality of buffers 88. In another example embodiment, each sub-set (e.g., two or more buffers 88) of the plurality of buffers 88 may be electrically coupled to a single FFTP 90. In yet another example embodiment, each buffer 88 may be electrically coupled to an associated FFTP 90.

The micro-lens array 74 may include large number (e.g., hundreds) of micro-lenses 72. The photodetector array 78 may include a large number (e.g., hundreds) of photodetectors 76. The detector electronics 84 may include a large number of A/D converters 82, buffers 86 and FFTPs 90 in accordance with the example embodiments described above.

The range processor 86 may compute dimensional information about the surface 36 of the target structure 38 from the digital signal supplied from the detector electronics 84. For example, the range processor 86 may calculate the range to the surface 36 of the target structure 38 imaged by each individual photodetector 76. The range processor 86 may report range values 102 for one or more measured points 92 and/or measured area 34 to the controller 40 (FIG. 1) for display. The range values 102 may be shown as a two-dimensional or three-dimensional representation of the target structure 38, for example on the display 64.

The controller 40 may be connected to the signal beam projector 12, the guide beam projector 14, the detector 48, the optical assembly 50, the range processor 86 and/or the display 64 using any suitable electrical connection, including, for example, any suitable wired, wireless and/or hard-wire communication. For example, the controller 40 may communicate power signals, control signals, data signals and status signals between the various components of the disclosed system 10.

The controller 40 may execute various commands, for example via the user interface 98, and may control the operation of all the components of the system 10. For example, the controller 40 may execute (e.g., trigger) processing of the digital signal supplied from the detector electronics 84 by the range processor 86 at a specific time and associate the calculated range values 102 with the image 66 of the target structure 38 obtained at the same point in time.

Figure 4:
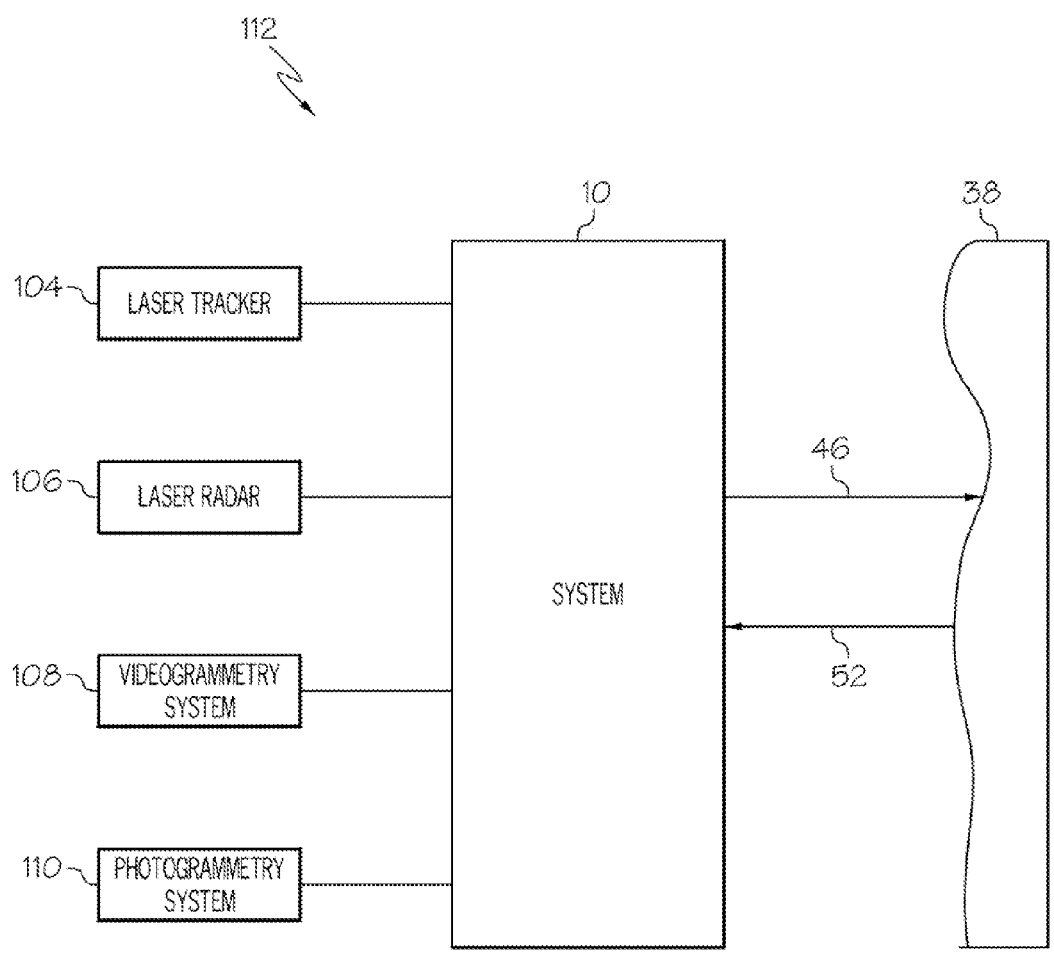
FIG. 4 is a block diagram of another embodiment of the disclosed laser metrology system.

Referring to FIG. 4, the disclosed system 10 may be integrated with other independent and external metrology systems 112. For example, the system 10 may be interconnected to and/or used with one or more of a laser tracker 104, a laser radar 106, a videogrammetry system 108 and/or a photogrammetry system 110. The controller 40 (FIG. 1) may communicate with and coordinate dimensional data (e.g., range values 102) between the external metrology systems 112.

Figure 5:
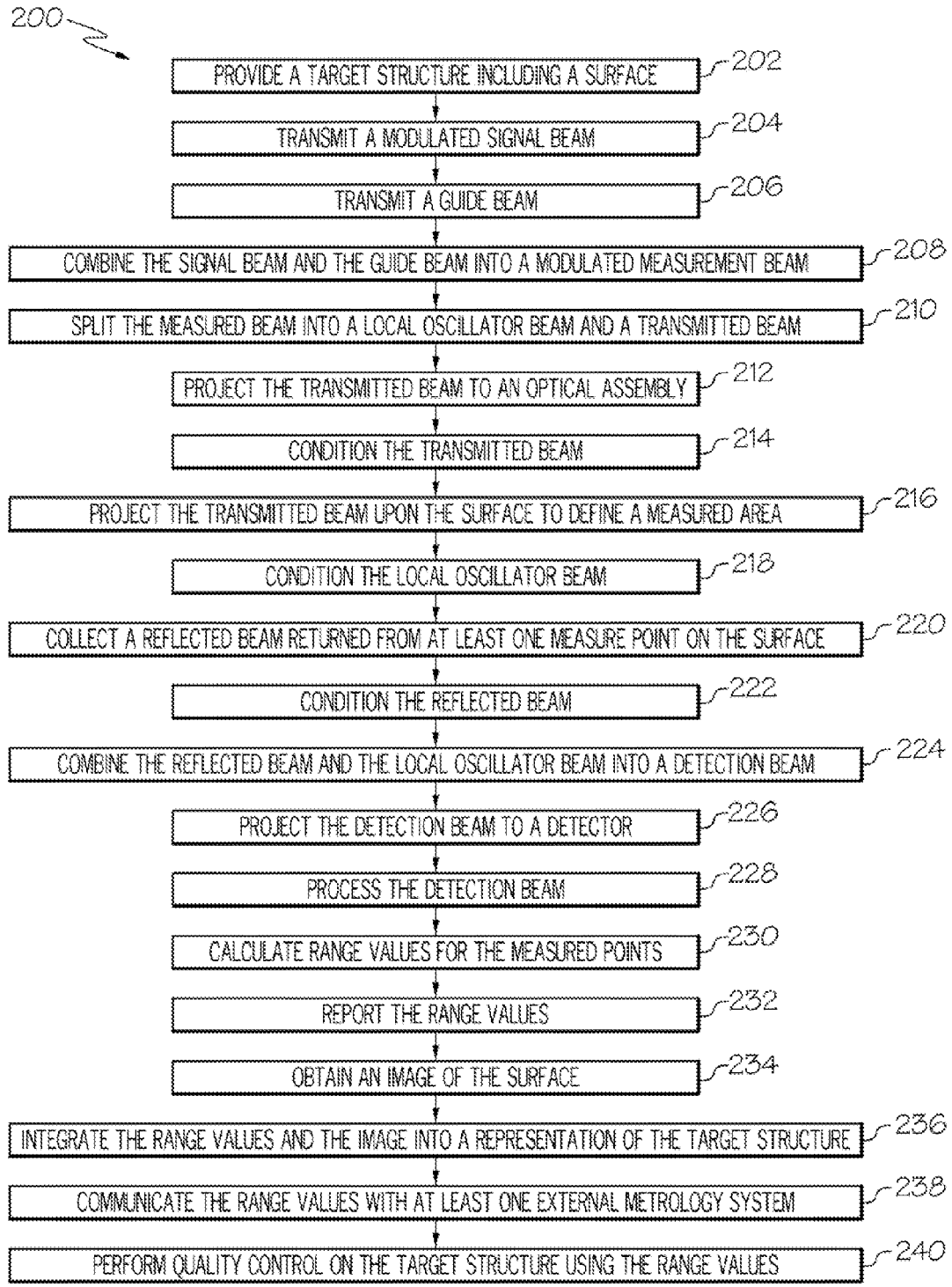
FIG. 5 is a flow diagram of one embodiment of the disclosed method for laser metrology.

Referring to FIG. 5, one embodiment of the disclosed method for laser metrology, generally designated 200, may begin at block 202 by providing a target structure. The target structure may include at least a surface.

As shown at block 204, a modulated signal beam may be transmitted. For example, the signal beam may be transmitted from a laser and modulated by a laser modulator.

Modulation of the signal beam may include amplitude, frequency, phase and/or polarity modulations.

As shown at block 206, a guide beam may be transmitted. For example, the guide beam may be transmitted by a laser.

As shown at block 208, the modulated signal beam and the guide beam may be combined into a modulated measurement beam.

As shown at block 210, the measurement beam may be split into two portions including a local oscillator beam and a transmitted beam. Both the local oscillator beam and a transmitted beam including the modulated signal beam and the guide beam.

As shown at block 212, the transmitted beam may be projected through an optical assembly. As shown at block 214, the transmitted beam may be conditioned by transmitted beam optics for optimum measurement of a measured area on the surface of the target structure.

As shown at block 216, the transmitted beam may be projected upon the surface of the target structure defining the measured area on the surface.

As shown at block 218, the local oscillator beam may be conditioned by local oscillatory optics to control an amount of light of the local oscillator beam.

As shown at block 220, a reflected beam may be returned from at least one measured point on the surface of the target structure and collected by the optical assembly along a similar optical as that of the transmitted beam. As shown at block 222, the reflected beam may be conditioned by reflected beam optics to focus the reflected beam.

As shown at block 224, the reflected beam and the local oscillator beam may be combined into a detection beam.

As shown at block 226, the detection beam may be projected to a detector. The detector may convert photons to electrons and process a digital signal generated by the electrons. The detector may include a plurality of micro-lenses forming a micro-lens array, a plurality of photodetectors forming a photodetector array and detector electronics. For example, the detection beam may be projected to the micro-lens array. Each micro-lens of the micro-lens array may project a portion of detection beam to an associated photodetector of the photodetector array. Each photodetector may define at least one measured point within the measured area on the surface of the target structure.

As shown at block 228, the detection beam (e.g., each portion of the detection beam) may be processed by carrying out coherent detection of the detection beam and generating informational data from the detection beam.

As shown at block 230, range values for the measured points may be calculated from the informational data. As shown at block 233, the range values may be reported. For example, the range values may be displayed to an operator and/or user.

As shown at block 234, an imaging system may obtain an image of the surface of the target object. For example, the image may be taken at the same point in time as the coherent detection of the detection beam.

As shown at block 236, the range values and the image may be integrated as a two-dimensional or three-dimensional representation of the surface of the structure.

As shown at block 238, the range values may be communicated with external metrology systems, such as a laser tracker, a laser radar, a videogrammetry system and a photogrammetry system.

As shown at block 240, the range values, the image and/or the integration of the range values and the image may be used for quality control during fabrication of the target structure and/or during inspection of the target structure.

Accordingly, the disclosed system and method may generate high precision dimensional data of a structure by coherent detection of projected modulated laser light using a large number of photodetectors. Transmitted light (e.g., transmitted beam) may illuminate an area on a surface of the structure and reflected light (e.g., reflected beam) may be received by an array of photodetectors using a local oscillator (e.g., local oscillator beam) to provide high sensitivity to the measurement. Visible light (e.g., guide beam) may assist a user orient the system to the structural area being measured. A separate imaging system (e.g., a video camera) may provide feature references to facilitate interpreting the coherent image. Thus, the disclosed system and method may reduce measurement times dramatically for large area surveys. Further, the disclosed system and method may supplement single point measurement systems with larger area measurements.

Figure 6:
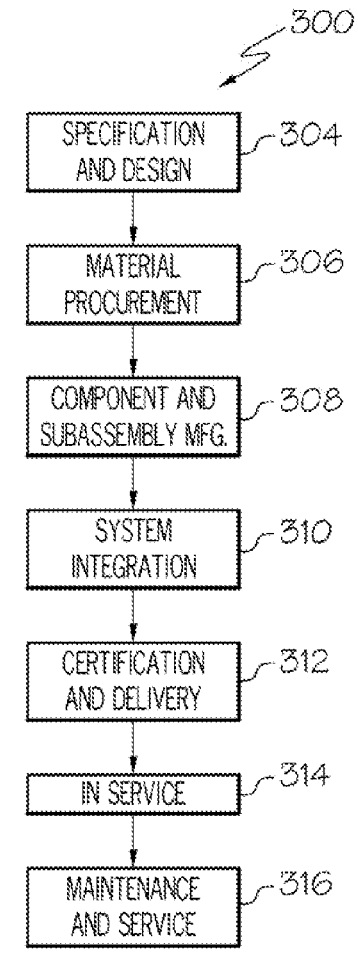
FIG. 6 is flow diagram of an aircraft production and service methodology.
Figure 7:
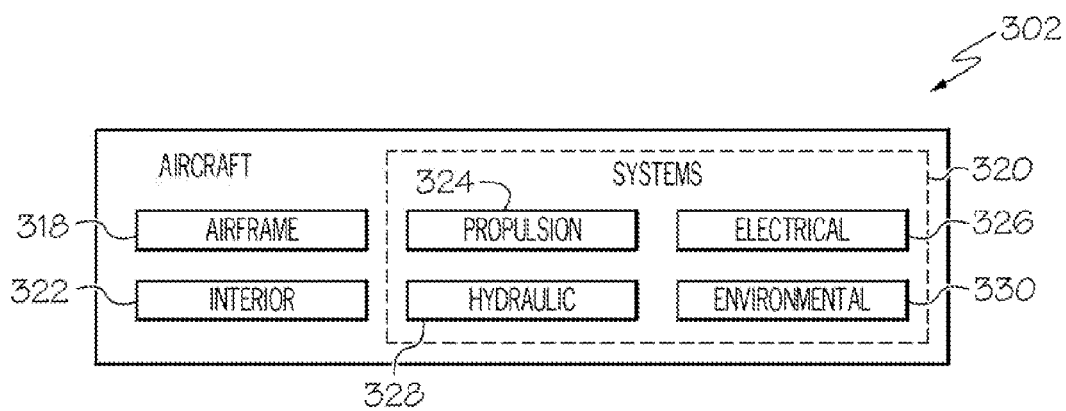
FIG. 7 is a block diagram of an aircraft.

Examples of the disclosure may be described in the context of an aircraft manufacturing and service method 300, as shown in FIG. 6, and an aircraft 302, as shown in FIG. 7. During pre-production, the aircraft manufacturing and service method 300 may include specification and design 304 of the aircraft 302 and material procurement 306. During production, component/subassembly manufacturing 308 and system integration 310 of the aircraft 302 takes place. Thereafter, the aircraft 302 may go through certification and delivery 312 in order to be placed in service 314. While in service by a customer, the aircraft 302 is scheduled for routine maintenance and service 316, which may also include modification, reconfiguration, refurbishment and the like.

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 302 produced by example method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosed system 10 and method 100 may be applied to other industries, such as the automotive industry.

Apparatus and methods embodied herein may be employed during any one or more of the stages of the production and service method 300. For example, components or subassemblies corresponding to component/subassembly manufacturing 308, system integration 310, and or maintenance and service 316 may be fabricated or manufactured using the disclosed system 10 (FIG. 1) and method 100 (FIG. 5). Also, one or more apparatus examples, method examples, or a combination thereof may be utilized during component/subassembly manufacturing 308 and/or system integration 310, for example, by substantially expediting assembly of or reducing the cost of an aircraft 302, such as the airframe 318 and/or the interior 322. Similarly, one or more of apparatus examples, method examples, or a combination thereof may be utilized while the aircraft 302 is in service, for example and without limitation, to maintenance and service 316.

Although various embodiments of the disclosed laser metrology system and method have been shown and described, modifications may occur to those skilled in the art upon reading the specification. The present application includes such modifications and is limited only by the scope of the claims.

What is claimed is:

1. A laser metrology system comprising:
a measurement beam, wherein said measurement beam is modulated;
a beam splitter for splitting said measurement beam into a local oscillator beam and a transmitted beam;
an optical assembly for expanding and projecting said transmitted beam to cover a measured area on a surface of a target structure and for receiving and focusing a plurality of reflected beams, said plurality of reflected beams being a return of a single projection of said transmitted beam from a plurality of measured points on said surface of said target structure within said measured area;
a beam combiner for combining said plurality of reflected beams and said local oscillator beam into a detection beam;
a detector for processing said detection beam, said detector comprising:
a plurality of micro-lenses forming a micro-lens array;
a plurality of photodetectors forming a photodetector array, wherein each one of said plurality of micro-lenses of said micro-lens array simultaneously projects one of said portions of said detection beam representing each one of said plurality of measured points within said measured area to an associated one of said plurality of photodetectors of said photodetector array, and wherein each one of said plurality of photodetectors of said photodetector array carries out coherent detection of each one of said portions of said detection beam; and
detector electronics in communication with said plurality of photodetectors of said photodetector array, wherein said detector electronics generate informational data from said portions of said detection beam for said plurality of measured points, and wherein said detector electronics comprise:
a plurality of analog-to-digital converters, wherein said plurality of analog-to-digital converters convert electrical signals from said plurality of photodetectors of said photodetector array into digital signals;
a plurality of buffers, wherein said plurality of buffers temporarily store said digital signals; and
a plurality of fast Fourier transform processors, wherein said plurality of fast Fourier transform processors compute a spectrum of said informational data from said digital signals; and
a range processor in communication with said detector electronics, wherein said range processor computes dimensional data for said plurality of measured points within said measured area from said informational data based on said single projection of said transmitted beam on and reflection of said plurality of reflected beams from said measured area on said surface of said target structure, calculates a range value for said each one of said plurality of measured points, and reports said range value for said each one of said plurality of measured points to a controller for display, and wherein a plurality of range values for said plurality of measured points are shown as a two-dimensional representation of said target structure.

2. The system of claim 1 further comprising:
a signal beam projector, said signal beam projector comprising a laser for transmitting a signal beam;
a guide beam projector, said guide beam projector comprising a laser for transmitting a guide beam; and
a beam combiner for combining said signal beam and said guide beam into said measurement beam.

3. The system of claim 2 wherein said signal beam projector comprises a laser modulator for modulating said signal beam.

4. The system of claim 1 wherein said optical assembly comprises transmitted beam optics for shaping said transmitted beam to said measured area.

5. The system of claim 1 wherein said optical assembly comprises reflected beam optics for collecting said reflected beams from said measured area.

6. The system of claim 1 wherein at least one analog-to-digital converter, at least one buffer and at least one fast Fourier transform processor are associated with said each one of said plurality of photodetectors of said photodetector array.

7. The system of claim 1 wherein said detector electronics process said digital signals from all of said plurality of photodetectors of said photodetector array simultaneously.

8. The system of claim 1 wherein said detector electronics process said digital signals from said each one of said plurality of photodetectors of said photodetector array individually.

9. The system of claim 1 wherein said detector electronics process said digital signals from said each one of said plurality of photodetectors of said photodetector array consecutively.

10. The system of claim 1 further comprising an imaging system for providing an image of said target structure, wherein said controller processes said digital signals from said detection electronics by said range processor at a specific point in time, and associates said range values with said image of said structure at the same point in time.

11. The system of claim 10 further comprising a display, wherein said range values shown as said two-dimensional representation of said target structure and said image are integrated by said controller and displayed on said display.

12. The system of claim 1 further comprising at least one of a laser tracker, a laser radar, a videogrammetry system and a photogrammetry system.

13. A laser metrology system comprising:
a signal beam projector comprising a laser for transmitting a signal beam, wherein said signal beam is modulated;
a guide beam projector comprising a laser for transmitting a guide beam;
a combiner for combining said signal beam and said guide beam into a measurement beam, wherein said measurement beam is modulated;
a beam splitter for splitting said measurement beam into a local oscillator beam and a transmitted beam;
transmitted beam optics for expanding said transmitted beam to cover a measured area on a surface of a target structure;
reflected beam optics for focusing a plurality of reflected beams, said plurality of reflected beams being a return of a single projection of said transmitted beam from a plurality of measured points on said surface of said target structure within said measured area;

local oscillator beam optics for controlling an amount of light of said local oscillator beam;
a beam combiner for combining said plurality of reflected beams and said local oscillator beam into a detection beam;
a detector for processing said detection beam, said detector comprising:
  a plurality of micro-lenses forming a micro-lens array;
  a plurality of photodetectors forming a photodetector array, wherein each one of said plurality of micro-lenses of said micro-lens array simultaneously projects one of said portions of said detection beam representing each one of said plurality of measured points within said measured area to an associated one of said plurality of photodetectors of said photodetector array, and wherein each one of said plurality of photodetectors of said photodetector array carries out coherent detection of each one of said portions of said detection beam; and
  detector electronics in communication with said plurality of photodetectors of said photodetector array, wherein said detector electronics generate informational data from said portions of said detection beam; for said plurality of measured points, and wherein said detector electronics comprise:
    a plurality of analog-to-digital converters, wherein said plurality of analog-to-digital converters convert electrical signals from said plurality of photodetectors of said photodetector array into digital signals;
    a plurality of buffers, wherein said plurality of buffers temporarily store said digital signals; and
    a plurality of fast Fourier transform processors, wherein said plurality of fast Fourier transform processors compute a spectrum of said informational data from said digital signals; and
a range processor in communication with said detector electronics, wherein said range processor computes dimensional data for said plurality of measured points within said measured area from said informational data based on said single projection of said transmitted beam on and reflection of said plurality of reflected beams from said measured area on said surface of said target structure, calculates a range value for said each one of said plurality of measured points, and reports said range value for said each one of said plurality of measured points to a controller for display, and wherein a plurality of range values for said plurality of measured points are shown as a two-dimensional representation of said target structure; and
an imaging system for providing an image of said surface of said target structure.

14. The system of claim 13 wherein at least one analog-to-digital converter, at least one buffer and at least one fast Fourier transform processor are associated with said each one of said plurality of photodetectors of said photodetector array.

15. A method for laser metrology of a target structure, said target structure comprising a surface, said method comprising:
transmitting a signal beam, wherein said signal beam is modulated;
transmitting a guide beam;
combining said signal beam and said guide beam into a measurement beam;
splitting said measurement beam into a local oscillator beam and a transmitted beam;
expanding said transmitted beam for coverage of a measured area of said surface of said target structure;
projecting said transmitted beam upon said measured area of said surface;
collecting a plurality of reflected beams, said plurality of reflected beams being a return of a single projection of said transmitted beam from a plurality of measured points on said surface within said measured area;
combining said plurality of reflected beams and said local oscillator beam into a detection beam;
projecting said detection beam to a detector, said detector comprising:
  a plurality of micro-lenses forming a micro-lens array;
  a plurality of photodetectors forming a photodetector array, wherein each one of said plurality of micro-lenses of said micro-lens array simultaneously projects one of said portions of said detection beam representing each one of said plurality of measured points within said measured area to an associated one of said plurality of photodetectors of said photodetector array; and
  detector electronics in communication with said plurality of photodetectors of said photodetector array, wherein said detector electronics comprise:
    a plurality of analog-to-digital converters;
    a plurality of buffers; and
    a plurality of fast Fourier transform processors;
processing said detection beam, wherein said processing comprises carrying out, by each one of said plurality of photodetectors of said photodetector array, coherent detection of each one of said portions of said detection beam and generating, by said detector electronics, informational data from said each one of said portions of said detection beam, and wherein:
  said plurality of analog-to-digital converters convert electrical signals from said plurality of photodetectors of said photodetector array into digital signals,
  said plurality of buffers temporarily store said digital signals,
  said plurality of fast Fourier transform processors compute a spectrum of said informational data from said digital signals;
calculating, by a range processor, range values from said informational data for said plurality of measured points based on said single projection of said transmitted beam on and reflection of said plurality of reflected beams from said measured area on said surface of said target structure; and
reporting, by said range processor, said range values to a controller for display, wherein a plurality of range values for said plurality of measured points are shown as a two-dimensional representation of said target structure.

16. The method of claim 15 further comprising conditioning said local oscillator beam for controlling an amount of light projected upon said detector prior to said combining said reflected beams and said local oscillator beam.

17. The method of claim 15 further comprising coordinating said range values with at least one of a laser tracker, a laser radar, a videogrammetry system and a photogrammetry system.

18. The system of claim 10 wherein said beam splitter splits said measurement beam and sends a larger fraction of energy out in said transmitted beam to said measured area and sends a smaller fractions of said energy in said local oscillator beam to said detector.

19. The system of claim 1 wherein:
each one of said plurality of analog-to-digital converters converts an electrical signal from said associated one of said plurality of photodetectors of said photodetector array into a digital signal;
each one of said plurality of buffers temporarily stores said digital signal from an associated one of said plurality of analog-to-digital converters; and
each one of said plurality of fast Fourier transform processors computes said informational data from said digital signal stored in an associated one of said plurality of buffers.

20. The system of claim 13 wherein said controller processes said digital signals from said detection electronics by said range processor at a specific point in time, and associates said range values with said image of said structure at the same point in time, and wherein said beam splitter splits said measurement beam and sends a larger fraction of energy out in said transmitted beam to said measured area and sends a smaller fractions of said energy in said local oscillator beam to said detector.

* * * * *